(12) United States Patent
Ott

(10) Patent No.: US 10,918,186 B2
(45) Date of Patent: Feb. 16, 2021

(54) SELF CLEANING BRUSH WITH HAIR COLLECTION

(71) Applicant: Edward Ott, Valrico, FL (US)

(72) Inventor: Edward Ott, Valrico, FL (US)

( * ) Notice: Subject to any disclaimer, the term of this patent is extended or adjusted under 35 U.S.C. 154(b) by 324 days.

(21) Appl. No.: 15/897,726

(22) Filed: Feb. 15, 2018

(65) Prior Publication Data

US 2019/0246764 A1  Aug. 15, 2019

(51) Int. Cl.
*A45D 24/40* (2006.01)
*A01K 13/00* (2006.01)
*A45D 24/04* (2006.01)
*A46B 9/02* (2006.01)
*A45D 24/10* (2006.01)

(52) U.S. Cl.
CPC ............ *A45D 24/40* (2013.01); *A01K 13/001* (2013.01); *A45D 24/04* (2013.01); *A45D 24/10* (2013.01); *A46B 9/023* (2013.01)

(58) Field of Classification Search
CPC ........ A45D 24/42; A45D 24/40; A45D 24/18; A45D 24/44; A01D 7/10
USPC ........ 132/125, 119; 15/104.5–104.54, 104.8, 15/48, 142, 257.1; 119/629, 628, 626, 119/611; 30/128, 233.5
See application file for complete search history.

(56) References Cited

U.S. PATENT DOCUMENTS

| | | | |
|---|---|---|---|
| 1,137,825 A * | 5/1915 | Wright ................. | A01D 7/10 56/400.08 |
| 1,339,863 A * | 5/1920 | Rechter ................ | A45D 24/42 132/119 |
| 1,669,302 A * | 5/1928 | Lanman ................ | A47L 13/52 15/104.8 |
| 2,392,036 A * | 1/1946 | Fleming ............... | A22C 9/008 452/146 |
| 2,562,465 A * | 7/1951 | Kassel ................. | A45D 24/42 132/119 |
| 2,999,259 A * | 9/1961 | Polner ................. | A47L 13/52 15/104.8 |
| 3,072,939 A * | 1/1963 | Rehberg ............... | A45D 24/46 15/38 |
| 3,077,199 A * | 2/1963 | Hayden ................ | A45D 24/42 132/119 |
| 3,172,139 A * | 3/1965 | Wire .................... | A46B 17/06 15/160 |
| 4,860,692 A * | 8/1989 | Beard .................. | A01K 13/002 119/629 |

(Continued)

FOREIGN PATENT DOCUMENTS

| | | | | |
|---|---|---|---|---|
| CA | 3010770 A1 * | 8/2017 | ............ | A46B 50/02 |
| DE | 102013011441 A1 * | 1/2015 | ............ | A46B 9/023 |

(Continued)

*Primary Examiner* — Nicholas D Lucchesi
(74) *Attorney, Agent, or Firm* — Justin Luby

(57) ABSTRACT

A grooming device with a self-cleaning and hair collecting features which allow the grooming apparatus to eject any hairs collected in the bristles or tines of the apparatus and collect the ejected hairs until it is convenient to dispose of the hair without having to touch the hair. The grooming device has a grooming section, a handle, a hair ejection device, and a hair collection device. The user will use the grooming device until it is full of hair, and then actuate the ejection device and collection device, which will trap the hairs until the uses releases the hair over a disposal container.

4 Claims, 9 Drawing Sheets

(56) References Cited

U.S. PATENT DOCUMENTS

| | | | | |
|---|---|---|---|---|
| 5,205,011 A * | 4/1993 | Flener | A46B 17/06 15/104.8 |
| 5,315,959 A * | 5/1994 | Podkowa | A45D 24/30 119/626 |
| 5,926,902 A * | 7/1999 | Pierre | A46B 17/06 119/628 |
| 7,159,274 B2 * | 1/2007 | Freidell | A01K 13/002 15/339 |
| 7,353,777 B2 * | 4/2008 | Morosin | A01K 13/002 119/612 |
| 7,665,422 B2 * | 2/2010 | Kissel, Jr. | A01K 13/00 119/609 |
| 7,854,214 B2 * | 12/2010 | Khubani | A01K 13/002 119/625 |
| 2004/0045168 A1 * | 3/2004 | Talavera | B26B 19/3813 30/133 |
| 2006/0000423 A1 * | 1/2006 | Morosin | A01K 13/002 119/600 |
| 2008/0052850 A1 * | 3/2008 | McKay | A46B 13/023 15/114 |
| 2009/0126648 A1 * | 5/2009 | Porter | A01K 13/002 119/601 |
| 2009/0272332 A1 * | 11/2009 | Lin | A46D 1/0284 119/633 |
| 2010/0122663 A1 * | 5/2010 | Fernandez | A01K 13/002 119/612 |
| 2010/0294210 A1 * | 11/2010 | Dyson | A01K 13/002 119/612 |
| 2011/0030620 A1 * | 2/2011 | Jouan | A01K 13/002 119/611 |
| 2014/0261226 A1 * | 9/2014 | Fung | A01K 13/002 119/625 |
| 2016/0150928 A1 * | 6/2016 | Kim | A47L 9/066 15/414 |
| 2017/0172105 A1 * | 6/2017 | Murrihy | A01K 13/002 |
| 2018/0055189 A1 * | 3/2018 | Gaon | A45D 24/18 |
| 2020/0037580 A1 * | 2/2020 | Axelrod | A46B 7/10 |

FOREIGN PATENT DOCUMENTS

| | | | | |
|---|---|---|---|---|
| FR | 2294665 A1 * | 7/1976 | | A46B 17/06 |
| GB | 285408 A * | 8/1928 | | A01K 13/002 |
| JP | 2019041610 A * | 3/2019 | | A01K 13/002 |

* cited by examiner

SELF CLEANING BRUSH WITH HAIR COLLECTION

CROSS-REFERENCE TO RELATED APPLICATIONS

Not Applicable

FIELD OF THE INVENTION

The present invention relates to grooming products for animals and humans alike, and more specifically a hair brush and/or rake that is designed to eject hair from the bristles of the brush and collect the hair ejected from the bristles in a collection chamber.

BACKGROUND

Grooming is a vital part in the well-being and healthiness of humans and animals alike. During the grooming process, hair is often collected in the bristles or tines of the grooming apparatus, such as a brush or comb. Grooming apparatus's are notoriously difficult to clean. The more bristles a grooming apparatus has the more difficult it is to clean.

The use of grooming apparatuses with self-cleaning capabilities of known designs and configurations is known in the prior art. More specifically, grooming apparatus with self-cleaning capabilities of known designs and configurations previously devised and utilized for the purpose of cleaning matter from the bristles of grooming apparatuses through known methods and apparatuses are known to consist basically of familiar, expected, and obvious structural configurations, notwithstanding the myriad of designs encompassed by the crowded prior art which has been developed for the fulfillment of countless objectives and requirements.

U.S. Pat. No. 6,427,633 teaches a brush with a cleaning element for removing hairs from the brush after use. The cleaning element of the brush includes a plate with openings through which the bristles protrude. When the plate is lowered, any hairs entwined in the bristles are pushed by the plate to the tips of the bristles where they are removed. The brush also has a post mechanism to adjust the cleaning element to various intermediary positions, effectively adjusting the length of the bristles for use of the brush.

U.S. Pat. No. 8,960,129 teaches a pet grooming tool provided with a fur ejector portion that is at least partially movable relative to the teeth of the pet grooming tool and can be manually moved into engagement with fur that is wedged or lodged between the teeth. The engagement of the fur ejector portion with the fur forces the fur from the gaps between the teeth. Preferably, the fur ejector portion can be manually moved by the same hand a person uses to support and hold the grooming tool.

While devices exist to eject hair from the bristles of a brush, once the hair is ejected from the bristles of the brush, the problem exists on what to do with the ejected hair. With the hair ejection devices currently available, the user will need to catch the ejected hair in their hand, or perform the process of ejecting the hair while holding the brush over the top of a wastebasket, which may or may not be available in the bathrooms, where most grooming takes place.

U.S. Pat. No. 9,351,476 teaches a grooming device which includes hair collectors and a scraper. The scraper uncovers the hair collectors when the device is pressed down for use, and scrapes the hair collectors to eject hair collected when the device is released or controlled manually. A collection chamber may be provided with a door or window on a surface of the collection chamber can be opened to empty the chamber of collected hair. However, the device is for removing and collecting already dislodged hairs embedded in an animal's coat, and is not intended to brush hair to straighten or detangle. Additionally, the collection chamber is located on the top of the device and does not automatically release the trapped hair, requiring the user to open the chamber and reach in to pull out the collected hairs. If the user is using the device on an animal, the user may not want to grab the hairs with their fingers, due to a unpleasant odor on the hair.

Accordingly, there is a need for an apparatus that is operable to comfortably groom a human or other pet and eject hair that may become entangled in the bristles or tines of the grooming apparatus.

Additionally, there is a need for an apparatus that capable of collecting the hair that is ejected from the apparatus in a manner that allows for simple of disposal of the hair without the user needing to contact the hair.

SUMMARY

It is the object of the present invention to provide a grooming apparatus that has self-cleaning features which allow the grooming apparatus to eject any hairs collected in the bristles or tines of the apparatus and collect the ejected hairs until it is convenient to dispose of the hair without having to touch the hair.

The grooming apparatus of the current invention is comprised of a grooming section, comprising a plurality of tines or bristles for running through hair, a handle, a hair ejection device, and a hair collection device, actuated by a trigger located on the underside of the handle.

The user will grip the handle and pull the grooming section through the hair of the person or animal it is grooming. As the grooming section is pulled through the hair several times, until the user deems the hair groomed, hair will likely collect in the grooming section of the device. Once the user is finished grooming, or the grooming section is too full of hair to continue grooming, the user will press the trigger on the handle, which will actuate the collection chamber to position itself so that hair collected in the grooming section will be pushed into the collection chamber when ejected from the brush and will push the ejection device between the bristles or tines of the grooming device, forcing hair caught in the grooming device out to the very ends of the bristles or tines, however, the collected hair will not be able to escape the grooming apparatus because the collection device will prevent them from leaving the grooming apparatus while the collection device is engaged with the grooming section. The user can then take the grooming apparatus to the location where the hair will be disposed, such as a wastebasket and disengage the collection device from the grooming section. This will cause the hair to fall from the collection device into the wastebasket, and the user will not need to touch the removed hair from the device.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

DETAILED DESCRIPTION OF THE INVENTION AND PREFERRED EMBODIMENT

Figure 1:
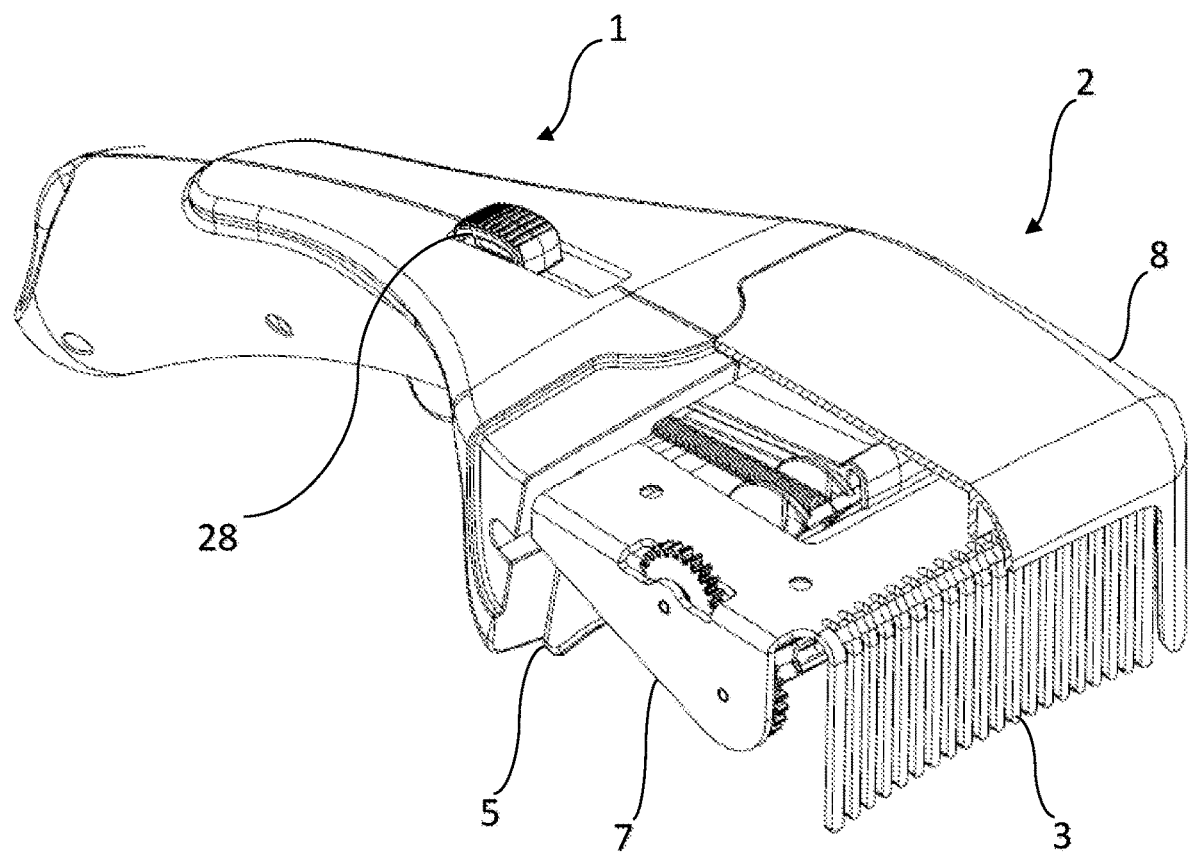
FIG. 1 illustrates a partial sectional perspective view drawing with a portion of the cover cut away, depicting the grooming apparatus in the primed position.
Figure 2:
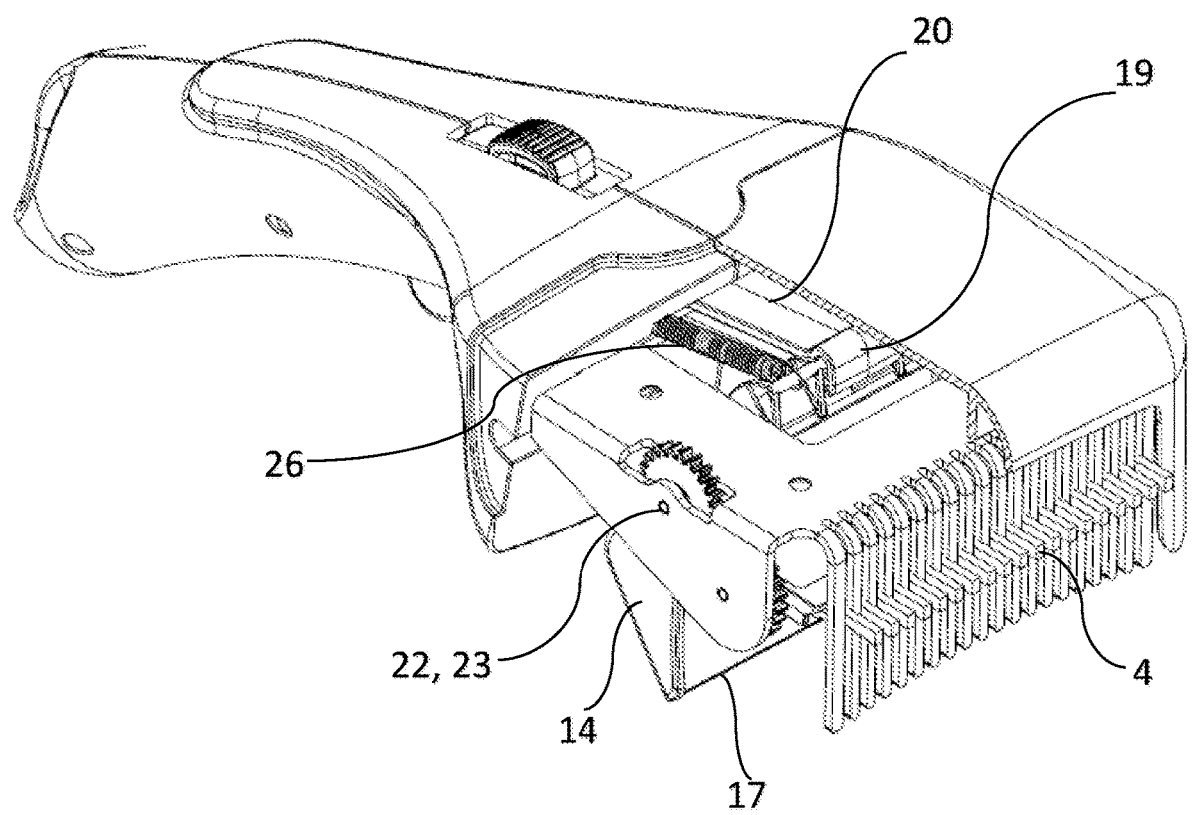
FIG. 2 illustrates a partial sectional perspective view drawing with a portion of the cover cut away, depicting the grooming apparatus in the process of transitioning from the primed position to the rest position.
Figure 3:
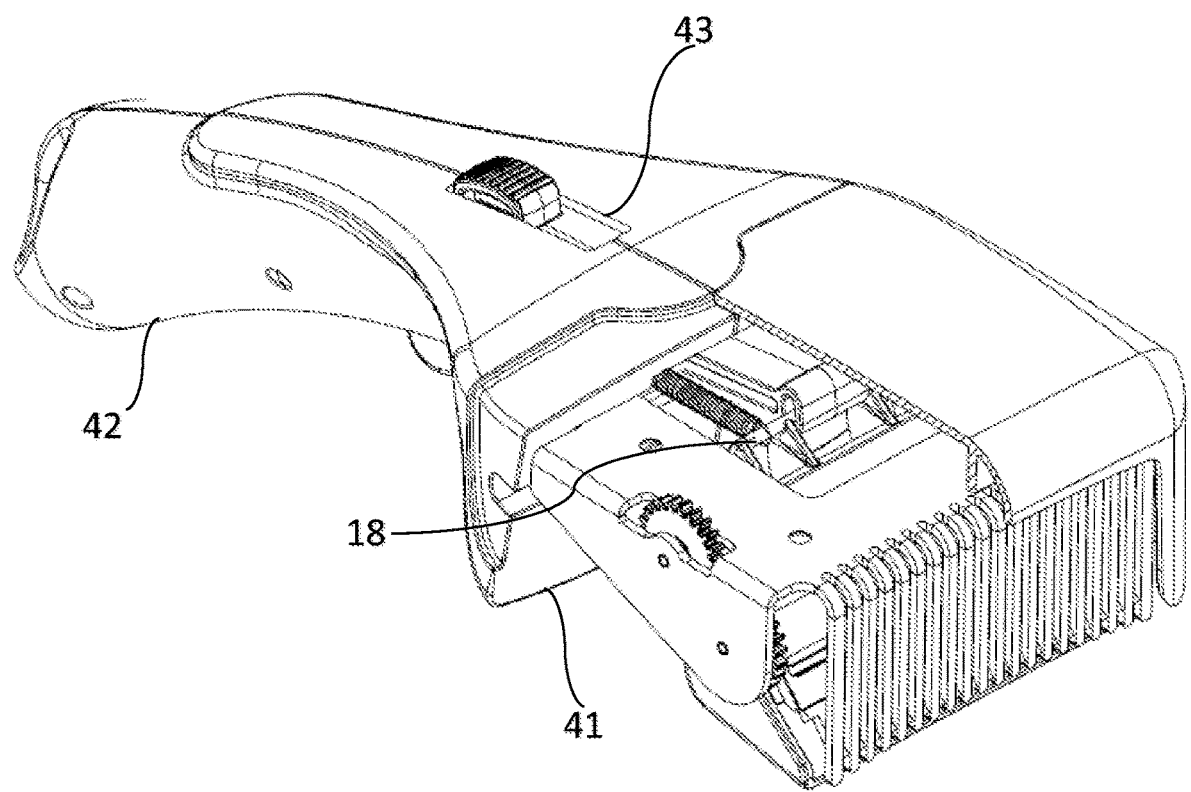
FIG. 3 illustrates a partial sectional perspective view drawing with a portion of the cover cut away, depicting the grooming apparatus in the rest position.
Figure 4:
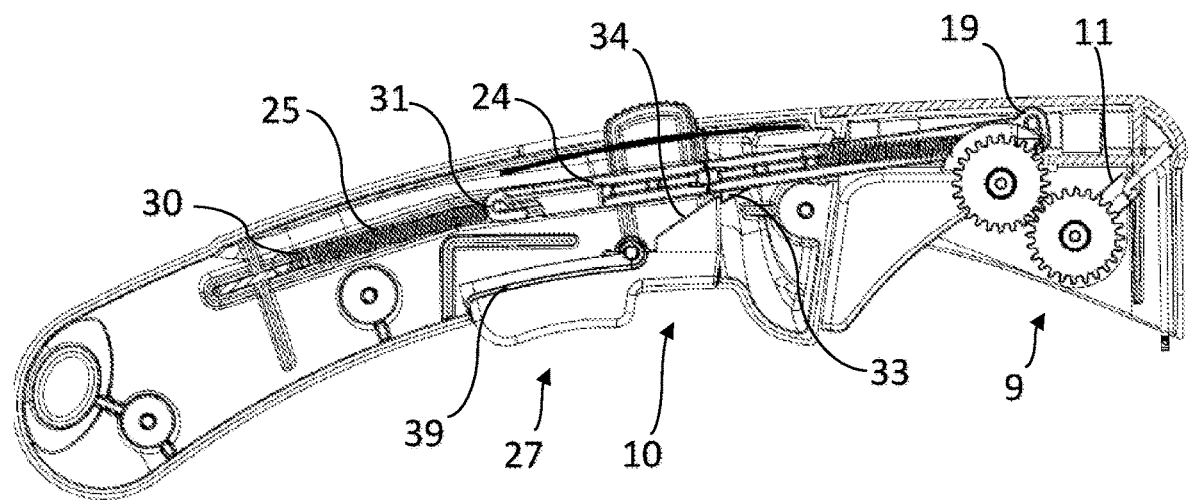
FIG. 4 illustrates a partial sectional side view drawing with one side of the brush handle removed from the apparatus, depicting the grooming apparatus in the primed position.

The present invention is directed at a grooming apparatus comprising a handle 1 and brush head 2, the brush head 2 having a plurality of comb bristles 3 where the comb bristles 3 are in general perpendicular orientation to the brush head 2, an ejector 4 which travels vertically through the spaces between the comb bristles 3, a collection scoop 5 which can be positioned at the ends of the bristles 3 to trap any hairs ejected from the brush head 2 from falling off the grooming device until the user releases the collection scoop 5. Referring to FIG. 2, when the apparatus is primed for grooming; the ejector 4 is located at the top of the comb bristles 3, and the collection scoop 5 is located at the handle 1 end of the brush head 2. Referring to FIG. 3, when the apparatus removes hair from the comb bristles 3, the ejector 4 moves downward between the comb bristles 3 and the collection scoop 5 rotates from the handle 1 end of the brush head 2 towards the comb bristles 3. Referring to FIG. 4, when the apparatus has cleaned hair from the comb bristles 3, the ejector 4 is in the downward position and the collection scoop 5 is in contact with the comb bristles 3.

Referring FIGS. 1-4 to in the preferred embodiment of the apparatus the brush head 2 is comprised of a plurality of comb bristles 3 which run vertically, an attachment piece 7, and a cover 8. The plurality of comb bristles 3 are equally spaced from each other in a row arrangement. The vertical sections of the comb bristles 3 are used to groom the hair. The attachment piece 7 protrudes rearwardly from the comb bristles 3 into the handle 1 of the grooming apparatus, where the attachment piece 7 is affixed to the brush handle 1. The cover 8 encapsulates the top of the brush head 2 and the ejector system 9, protecting users hair from becoming entangled in the ejector system 9.

Referring to FIGS. 1-7, in the preferred embodiment of the apparatus the ejector system 9 is comprised of an ejector 4, collection scoop 5, and an actuation system 10.

The ejector 9 is comprised of a lateral ejector brush holder 11 which has a brush gear 12 connected at one end, and brush bristles 13. The ejector 9 is connected to the cover 8 on either end by a hinged connection, allowing the ejector 4 to rotate. The lateral ejector brush holder 11 is approximately the same width as the brush bristles 13. Attached to the ejector brush holder 11 are a plurality of ejector bristles 13, which protrude from the ejector brush holder 11 through the spaces between the comb bristles 3. When the brush gears 12 is rotated, this will also rotate the ejector brush holder 11 and ejector bristles 13 from their "primed" location at the top of the brush head 2, downward through the comb bristles 3, into the scoop 5.

In the preferred embodiment the collection scoop 5 is a hollow three-dimensional shape, open in the front, with side walls 14, a rear wall 15, and a bottom wall 16. There is a leading edge 17, which extends between the side walls 14 and the front of the bottom wall 16. In the preferred embodiment, the scoop 5 takes a triangular shape, however, the collection scoop 5 could take any number of shapes, including, but not limited to concave semi-circular, triangular, and square. Additionally, while the use of sidewalls 14 is preferred sidewalls are not considered to be critical to the functionality of the apparatus, without the sidewalls 14 the apparatus could still trap longer hairs, however, the collection scoop's 5 ability to trap shorter hairs would be limited.

Protruding outward from the top of the scoop 5 is the pushbar attachment 18. The pushbar attachment 18 connects to the pushbar finger 19, which transfers the lateral movement of the pushbar 20 to a rotational motion of the scoop 5.

Attached to the side of the scoop 5 is a scoop gear 21. The scoop gear 21 is mated with the ejector gear 12. As the scoop gear 21 is rotated to is "primed" position, it will rotate the ejector 4 to its "primed" position, at the top of the brush head 2.

At the top of the scoop 5 and on either side of the scoop 5 is a hinge protrusion 22. The hinge protrusions 22 have an outer dimeter smaller than the inner diameter of mates the hinge holes 23 in the brush gear 12 and attachment piece 7 so that the hinge protrusions 22 and hinge holes 23 mate to form hinged connections around which the scoop 5 will pivot.

The actuation system 10 is comprised of a slide 24, slide spring 25, pushbar 20, pushbar springs 26, and trigger 27. The slide 24 has a top portion 28, where the users finger engages the slide button, and a bottom portion 29, where the slide button 24 is able to transfer forward motion from the slide button 24 to the pushbar 20.

Attached to the slide 24 is a slide spring 25 which has a rear end 30, which is attached to the brush handle 1 and front end 31, which is attached to the rear end of the slide 24.

The pushbar 20 travels from the slide 24 to the scoop pushbar attachment 18 and is comprised of a rear end 32, which the slide 24 pushes against, and a front end 33 with a pushbar finger 19 that engages with the scoop pushbar attachment 18. Located on the underside of the pushbar 20 is a trigger stopper 33, that engages with the trigger lock 34.

The apparatus also has a pushbar spring 26 which has a rear end 36, which is attached to the brush handle 1 and front end 37, which is attached to the front end 31 of the pushbar 20.

The trigger 27 is located on the underside of the brush handle 1, and has a finger section 38, where the users finger can push against the trigger 27, and a trigger lock 34, which protrudes upward from the finger section 38, and engages with the trigger stopper 33.

Attached to the trigger 27 and the brush handle 1 is a trigger return spring 39. The return spring 39 keeps a downward pressure on the rear end of the trigger 40, which in turn keeps and upward pressure on the trigger lock 34 so that the trigger lock 34 will remain engaged with the trigger stopper 33 when the grooming apparatus is primed.

The actuation system 10 operates by the to load the apparatus by the user pushing the slider 24 forward. The slider 24 engages with pushbar 20 and pushes the pushbar 20 moves forward. The pushbar 20 moves forward to the point that the pushbar finger 19 engages the pushbar attachment 18, rotates the scoop gear 21 and stretches the pushbar spring 26. Once the scoop 5 is rotated to its primed position, the trigger lock 34 engages with the pushbar trigger stopper 33 in place to hold the pushbar 20 and spring 26 in place.

At the same time the scoop gear 21 rotates, the brush gear 12 rotates the opposite direction as a result of the mated scoop gear 21 and brush gear 12. The rotation of the brush gear 12 will position the ejector 4 so that the brush tips 13 are at their "primed" location at the top of the comb bristles 3.

For the user to actuate the grooming apparatus from the "primed" position the user will pull the trigger 27 which will disengage trigger lock 34 and the trigger stopper 33. Once the trigger lock 34 and trigger stopper 33 are disengaged the tension from the pushbar spring 26 will cause the pushbar 20 to retract, and the pushbar finger 19 to engage with the scoop psuhbar attachment 18 causing the scoop 5 to rotate counterclockwise until it contacts the comb bristles 3.

Figure 5:
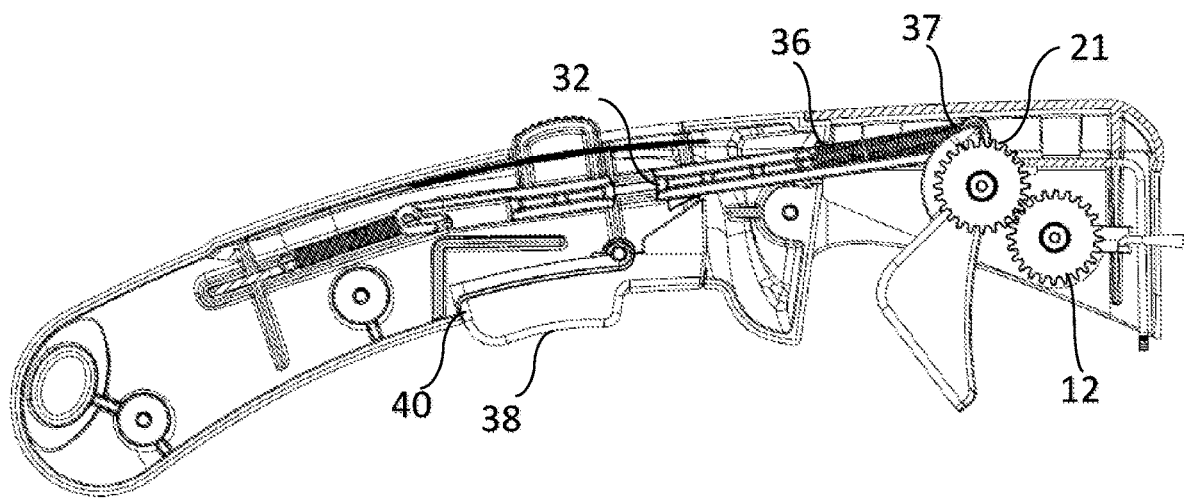
FIG. 5 illustrates a partial sectional side view drawing with one side of the brush handle removed from the apparatus, depicting the grooming apparatus in the process of transitioning from the primed position to the rest position.
Figure 6:
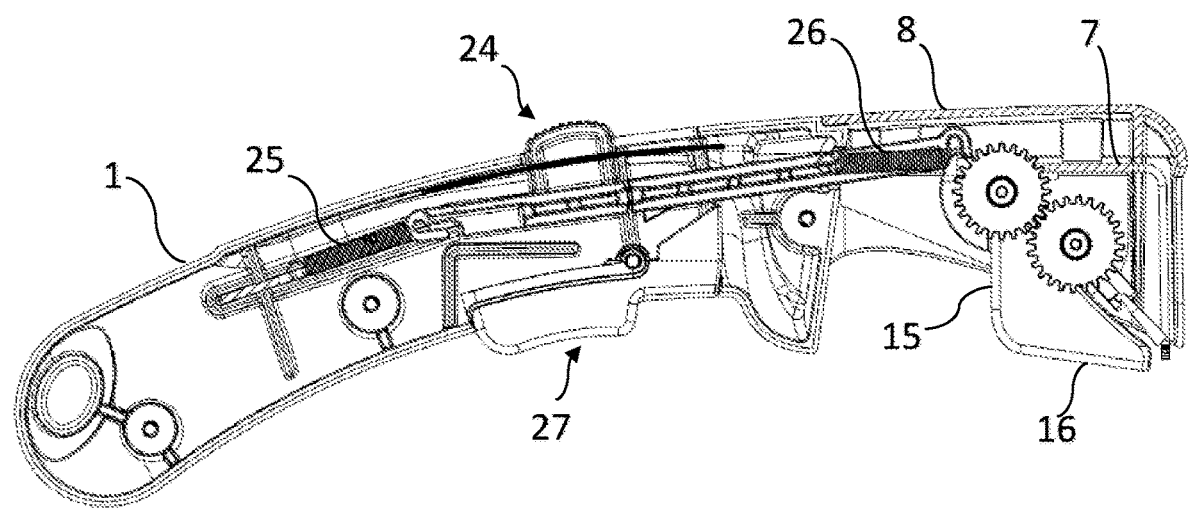
FIG. 6 illustrates a partial sectional side view drawing with one side of the brush handle removed from the apparatus, depicting the grooming apparatus in the rest position.

Referring to FIGS. 4, 5, & 6, the handle 1 has a front 41 and a rear side 42. The rear side 42 of the handle 1 is where the user will grip the device. Attached to the front side 41 of the handle is the cover 8 and attachment piece 7. The handle 1 has a slot 43 in top of the handle through which the slide 24 will travel. Additionally the underside of the handle 1 has a cavity where the trigger 27 will be located.

The handle 1 is hollow, and is made up of two side pieces, left and right which snap together. The handle has an opening in the front side of the handle through which the brush head attachment piece 7 can be attached to so that the brush head 2 can be affixed to the brush handle 1 and through which the pushbar 20 can travel back and forth through. Inside the hollow handle 1, the actuation system 10 is located.

The user will grip the handle 1 and pull the comb bristles 3 through the hair of the person or animal it is grooming. As the comb bristles 3 are pulled through the hair several times, until the user deems the hair groomed, hair will likely collect in the comb bristles 3 of the device. Once the user is finished grooming, or the grooming section is too full of hair to continue grooming, the user will press the trigger 27 on the handle 1, which will actuate the scoop 5 to position itself so that hair collected in the comb bristles 3 will be pushed into the scoop 5 when ejected from the apparatus. As the scoop 5 moves into place, the ejector 4 moves between the comb bristles 3 of the grooming device, forcing hair caught in the comb bristles 3 out to the very ends of the comb bristles 3, however, the collected hair will not be able to escape the grooming apparatus because the scoop 5 will prevent them from leaving the grooming apparatus while the scoop 5 is engaged with the comb bristles 3. The user can then take the grooming apparatus to the location where the hair will be disposed, such as a wastebasket, and return the apparatus to the primed position, disengaging the scoop 5 from the comb bristles 3. This will cause the hair to fall from the scoop 5 into the wastebasket, and the user will not need to touch the removed hair from the apparatus.

Figure 7:
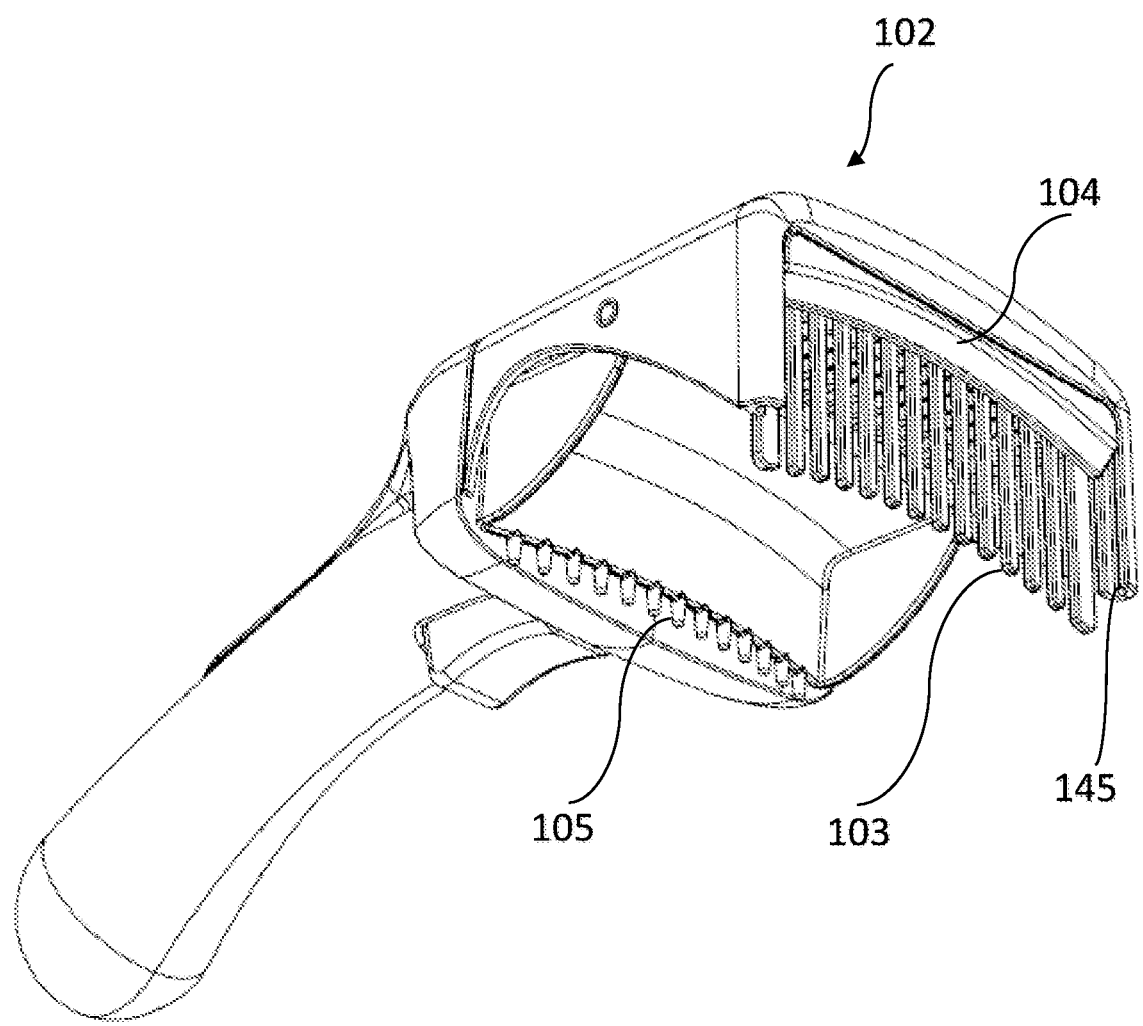
FIG. 7 illustrates a bottom perspective view drawing of a alternate embodiment of the grooming apparatus with the scoop in the primed position.
Figure 8:
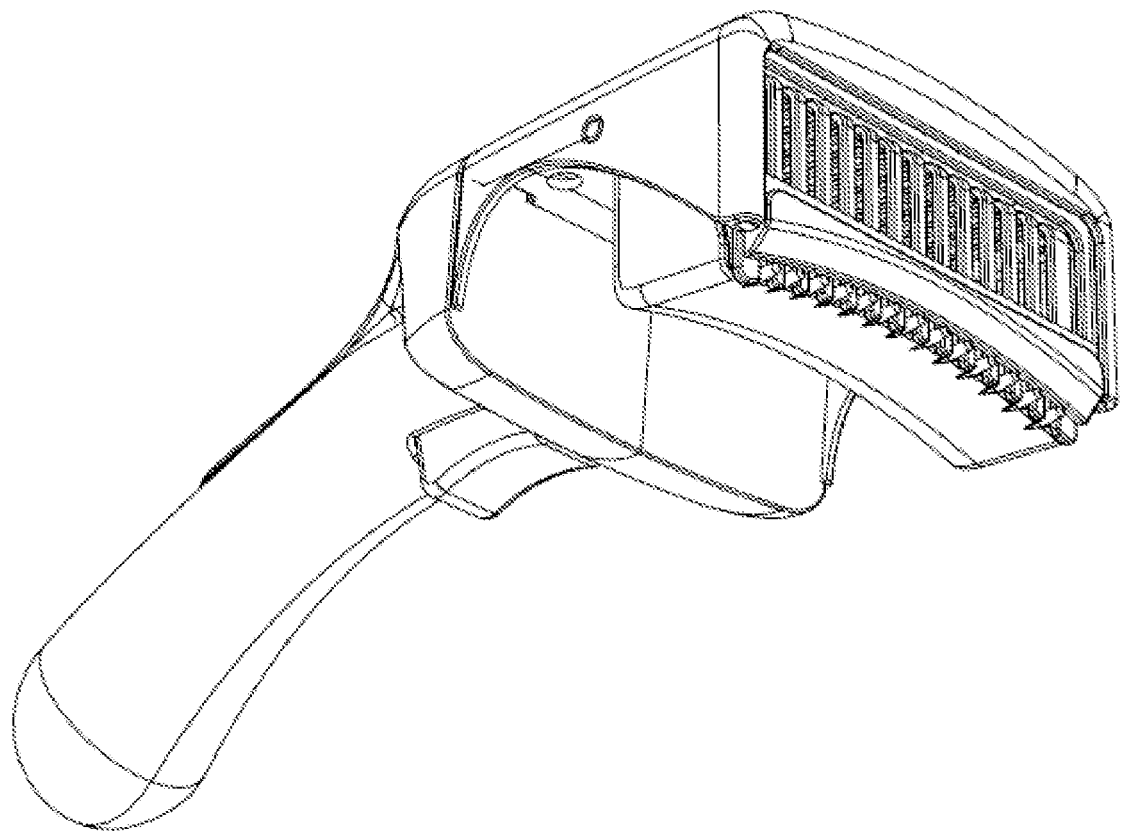
FIG. 8 illustrates a bottom perspective view drawing of an alternate embodiment of the grooming apparatus in the rest position.
Figure 9:
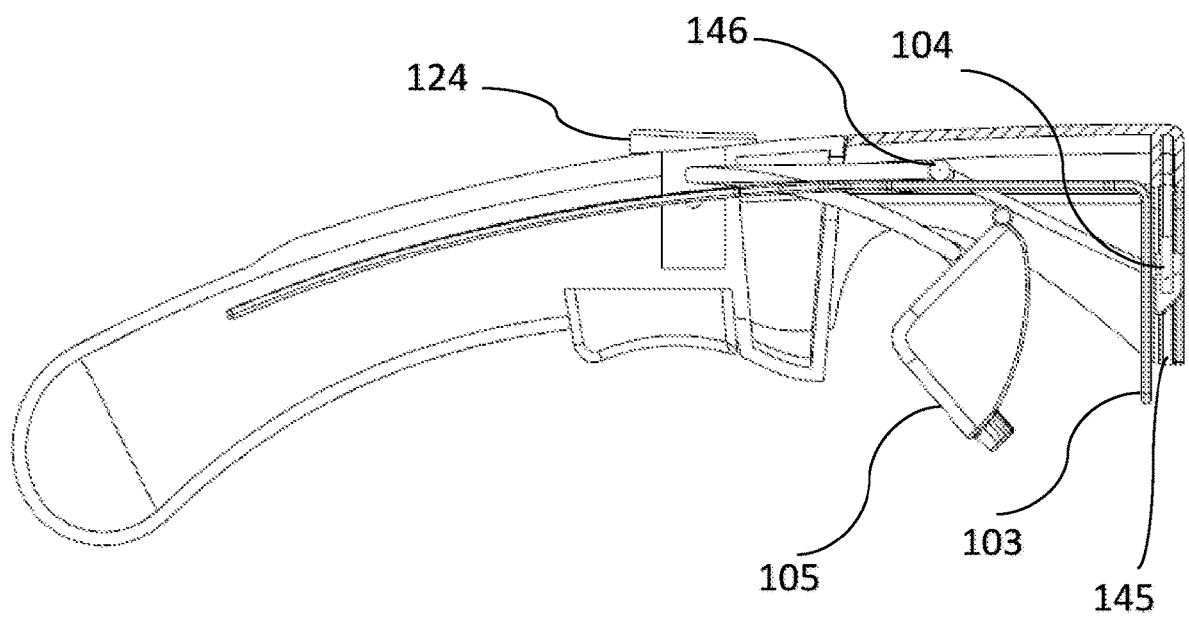
FIG. 9 illustrates a partial sectional side view drawing an alternate embodiment of the grooming apparatus with one side of the brush handle removed from the apparatus.

FIGS. 7-9 depict an alternate embodiment of the current invention where the grooming apparatus ejector 104 is a rigid material which travels vertically up and down through the comb bristles 103. In this embodiment of the invention the brush head 102 also includes a ejector guide 145 which directs the ejector up and down to remove hair from the comb bristles 103.

In this embodiment the ejector is actuated by a slide 124 which is attached to the ejector 104 via a hinged connection 146. When the user pushes the slide 124 forward laterally, the hinged connection 146 and the ejector guide 145 will transfer the lateral movement of the slide 124 to a downward vertical movement of the ejector 104, pushing and hair collected in the comb bristles 103 to the bottom of the comb bristles 103 and into the scoop 105.

Materials for all parts of the present invention, including all described or extrapolated embodiments may be made from the following that include, but are not limited to: metals, plastics, or any composites of such materials. The various parts to the present invention may be manufactured from identical or different materials, combinations of materials, or composites of materials.

It would be appreciated by those skilled in the art that various changes and modifications can be made to the illustrated embodiments without departing from the spirit of the present invention. All such modifications and changes are intended to be covered by the appended claims.

What is claimed is:

1. A grooming apparatus comprising:
    a handle for gripping and guiding the grooming apparatus;
    a row of comb bristles comprised of a plurality of comb bristles oriented vertically with lateral spaces between the bristles, each comb bristle having a top and bottom;
    a head member affixed to the handle and the row of comb bristles, the row of comb bristles being laterally oriented perpendicular to the handle and vertically protruding downward from the head member;
    an ejector which travels vertically from the top of the comb bristles to the bottom of the comb bristles and between the lateral spaces between the comb bristles to remove any hair captured within the comb bristles;
    a hair collector comprising a hollow three-dimensional shape, open in the front, with side walls, a rear wall, and a bottom wall, connected to the head member with a hinged connection whereby the hair collector can be rotated from a position where the bottom wall does not contact the bottom of the comb bristles to a position where the hair collector does contact the bottom of the comb bristles to capture hair ejected from the comb bristles inside the hollow hair collector and rotatably positioned away from the bottom of the plurality of comb bristles so that captured hair can be disposed of;
    an actuator located on the handle for initiating travel of the ejector from the top of the comb bristles to the bottom of the comb bristles.

2. The grooming apparatus of claim 1, wherein the ejector further comprises a plurality of flexible bristles connected to the head member with a hinged connection whereby the flexible bristles protrude through the lateral spaces between the comb bristles and can be rotated from a position at the top of the comb bristles to the bottom of the comb bristles.

3. The grooming apparatus of claim 2, further comprising a mechanism attached to the head member to rotate both the ejector and hair collector, wherein the mechanism is triggered by the actuator, wherein the ejector and hair collector each further comprise a gear, where the gears are meshed together such that when the ejector rotates from the position at the top of the comb bristles to the bottom of the comb bristles the meshed gears will simultaneously rotate the hair collector from a position where the bottom wall does not contact the bottom of the comb bristles to a position where the hair collector does contact the bottom of the comb bristles.

4. The grooming apparatus of claim 1, wherein the ejector further comprises a rigid slide with spacers which can fill the lateral spaces between the comb bristles, the rigid slide being connected to the head member by a guide which orients the ejector as it travels from a position at the top of the comb bristles to the bottom of the comb bristles.

\* \* \* \* \*